(12) United States Patent
Ueno et al.

(10) Patent No.: US 10,851,839 B2
(45) Date of Patent: Dec. 1, 2020

(54) BEARING DEVICE FOR AXLE

(71) Applicant: NTN CORPORATION, Osaka (JP)

(72) Inventors: Masanori Ueno, Mie (JP); Kengo Suzuki, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/330,790

(22) PCT Filed: Aug. 30, 2017

(86) PCT No.: PCT/JP2017/031047
§ 371 (c)(1),
(2) Date: Mar. 6, 2019

(87) PCT Pub. No.: WO2018/056000
PCT Pub. Date: Mar. 29, 2018

(65) Prior Publication Data
US 2019/0195283 A1   Jun. 27, 2019

(30) Foreign Application Priority Data

Sep. 20, 2016 (JP) .................................. 2016-182581

(51) Int. Cl.
*F16C 33/76* (2006.01)
*B61F 15/12* (2006.01)
(Continued)

(52) U.S. Cl.
CPC ............ *F16C 33/768* (2013.01); *B61F 15/12* (2013.01); *B61F 15/22* (2013.01); *F16C 19/386* (2013.01);
(Continued)

(58) Field of Classification Search
CPC .... F16C 33/76; F16C 33/768; F16C 33/7803; F16C 33/7806; F16C 33/7809;
(Continued)

(56) References Cited

U.S. PATENT DOCUMENTS

| 7,419,306 B2* | 9/2008 | Miki ...................... B61F 15/22 384/477 |
| 2016/0017926 A1* | 1/2016 | Ooe ...................... F16C 19/385 384/486 |

FOREIGN PATENT DOCUMENTS

| JP | 2001-254735 | 9/2001 |
| JP | 2005-325867 | * 11/2005 |

(Continued)

OTHER PUBLICATIONS

International Preliminary Report on Patentability dated Mar. 26, 2019 in International (PCT) Application No. PCT/JP2017/031047.
(Continued)

*Primary Examiner* — James Pilkington
(74) *Attorney, Agent, or Firm* — Wenderoth, Lind & Ponack, L.L.P.

(57) ABSTRACT

A bearing device for an axle has: a first axial gap (G1), which is defined between the inner ring (3) and the back cover (11) in an axial direction, and has the spacer (21) interposed therein; a second axial gap (G2), which is larger than the first axial gap (G1), and has the sealing member (22) interposed therein; and a third axial gap (G3), which is defined on a radially outer side of the second axial gap (G2), and is smaller than the second axial gap (G2).

8 Claims, 3 Drawing Sheets

(51) Int. Cl.
  *B61F 15/22* (2006.01)
  *F16C 19/38* (2006.01)
  *F16C 35/063* (2006.01)
(52) U.S. Cl.
  CPC ............ *F16C 33/76* (2013.01); *F16C 35/063* (2013.01); *F16C 2326/10* (2013.01)
(58) Field of Classification Search
  CPC .. F16C 33/7813; F16C 33/805; F16C 35/063; B61F 15/12; B61F 15/22
  See application file for complete search history.

(56) References Cited

FOREIGN PATENT DOCUMENTS

| JP | 2007-292130 | 11/2007 |
| JP | 4060232 | 3/2008 |
| JP | 2015-75218 | 4/2015 |

OTHER PUBLICATIONS

International Search Report dated Oct. 3, 2017 in International (PCT) Application No. PCT/JP2017/031047.

\* cited by examiner

BEARING DEVICE FOR AXLE

TECHNICAL FIELD

The present invention relates to a bearing device for an axle, which is configured to support an axle of a railway vehicle or the like.

BACKGROUND ART

FIG. 4 is an illustration of an example of a bearing device configured to support an axle 101 of a railway vehicle. The bearing device includes a rolling bearing 102, a back cover 111, and an oil thrower 112. The back cover 111 and the oil thrower 112 are arranged on both sides of the rolling bearing 102 in an axial direction. The rolling bearing 102 is a double-row tapered roller bearing, and includes divided-type inner rings 103, an integrated-type outer ring 104, double-row tapered rollers 105, and a cage 106. The double-row tapered rollers 105 are arranged between the inner rings 103 and the outer ring 104. The cage 106 is configured to retain the tapered rollers 105 in each row at equal intervals in a circumferential direction. The back cover 111, the rolling bearing 102, and the oil thrower 112 are fitted onto an outer periphery of the axle 101. After that, an axial-end nut or a front cover (not shown) is mounted to an end portion of the axle 101, and the rolling bearing 102 and the oil thrower 112 are sandwiched by the axial-end nut or the front cover and the back cover 111 from both sides in the axial direction. In this manner, the rolling bearing 102 is positioned with respect to the axle 101 in the axial direction.

When an excessive radial load acts on the axle 101 so that a large bending moment is applied to the axle 101, fretting wear occurs in each of a contact portion X' between the inner ring 103 of the rolling bearing 102 and the back cover 111 and a contact portion Y' between the inner ring 103 and the oil thrower 112, to thereby generate minute wear powder. In particular, fretting wear is more liable to occur in the contact portion X' between the inner ring 103 and the back cover 111 than in the contact portion Y' between the inner ring 103 and the oil thrower 112. When fretting wear continuously occurs, positional accuracy of the rolling bearing 102 with respect to the axle 101 in the axial direction is degraded, and the wear powder thus generated enters an inside of the rolling bearing 102 to degrade lubricant inside the bearing, which becomes a factor that shortens a lifetime of the rolling bearing 102.

In view of this, in Patent Literature 1, as illustrated in FIG. 5, a spacer member 120 (annular spacer with an elastic seal member) is arranged between the inner ring 103 and the back cover 111. The spacer member 120 includes a spacer 121 (annular spacer) and a sealing member 122 (elastic seal member) firmly fixed to a radially outer end of the spacer 121. As described above, the spacer 121 is interposed between the inner ring 103 and the back cover 111 so that direct contact between the inner ring 103 and the back cover 111 is avoid, thereby being capable of suppressing fretting wear. Further, the sealing member 122 provided on the radially outer end of the spacer 121 is held in close-contact with both of the inner ring 103 and the back cover 111 over the entire periphery while being elastically deformed, thereby being capable of sealing a gap between the inner ring 103 and the back cover 111. With this, wear powder generated in the contact portion X' between the inner ring 103 and the back cover 111 through intermediation of the spacer 121 can be blocked by the sealing member 122. Thus, it is possible to reliably prevent such a situation that wear powder enters the inside of the rolling bearing 102.

CITATION LIST

Patent Literature 1: JP 4060232 B2

SUMMARY OF INVENTION

Technical Problem

The above-mentioned sealing member repeatedly receives a fluctuation load due to warpage and rotation of the axle under a state in which the sealing member is elastically deformed by being sandwiched between the inner ring and the back cover. Thus, there is a fear in that the sealing member is damaged due to long-term use. The spacer member is replaced at each regular inspection for the bearing for an axle. Thus, in general, the spacer member is not continuously used until the above-mentioned damage occurs. However, even when the sealing member is damaged due to an unexpected factor, and the sealing member is separated away from the spacer, there is a fear in that the sealing member projects to the radially outer side from the gap between the inner ring and the back cover to be caught in the inside of the rolling bearing (between the inner ring and the outer ring), with the result that bearing performance is degraded.

It is an object of the present invention to avoid such a risk in a bearing device for an axle that, even when a sealing member is damaged and is separated away from a spacer, the sealing member is caught in an inside of a rolling bearing to degrade bearing performance.

Solution to Problem

In order to solve the problems described above, according to one embodiment of the present invention, there is provided a bearing device for an axle, comprising: a rolling bearing comprising an inner ring, an outer ring, and a plurality of rolling elements interposed between the inner ring and the outer ring; a ring member provided on one side of the inner ring in an axial direction; a spacer sandwiched by the inner ring and the ring member; and a sealing member, which is fixed to a radially outer end of the spacer, and is held in close-contact with both of the inner ring and the ring member over an entire periphery of the sealing member while being elastically deformed, wherein the bearing device for an axle has: a first axial gap, which is defined between the inner ring and the ring member in the axial direction, and has the spacer interposed therein; a second axial gap, which is larger than the first axial gap, and has the sealing member interposed therein; and a third axial gap, which is defined on a radially outer side of the second axial gap, and is smaller than the second axial gap.

As described above, in the bearing device for an axle according to the present invention, the third axial gap that is smaller than the second axial gap is defined on the radially outer side of the second axial gap. With this, even when the sealing member arranged in the second axial gap is separated away from the spacer, movement of the sealing member to the radially outer side can be restricted with the third axial gap having a smaller width. Therefore, it is possible to avoid such a situation that the sealing member projects to the radially outer side from the gap between the inner ring and the back cover (ring member) to enter the inside of the rolling bearing.

In the above-mentioned bearing device for an axle, an end surface of the ring member may comprise: a first region formed on a radially inner end of the end surface of the ring member; a second region, which is formed on a radially outer side of the first region, and retreats to a side away from the inner ring with respect to the first region; and a third region, which is formed on a radially outer side of the second region, and protrudes to a side closer to the inner ring with respect to the second region. In this case, the first axial gap, the second axial gap, and the third axial gap are formed in axial spaces between the end surface of the inner ring on the one side in the axial direction and the first region, the second region, and the third region of the end surface of the ring member, respectively.

When the third axial gap is set to be smaller than an axial dimension of the sealing member and smaller than a radial thickness of the sealing member, it is possible to reliably avoid such a situation that the sealing member passes through the third axial gap.

The rolling bearing of the above-mentioned bearing device for an axle may be, for example, a double-row tapered roller bearing in which double-row tapered rollers are interposed between the outer ring and the inner ring as the rolling elements.

Advantageous Effects of Invention

As described above, in the bearing device for an axle according to the present invention, even when the sealing member is damaged and is separated away from the spacer, it is possible to avoid a risk in that the sealing member is caught in the inside of the rolling bearing to degrade bearing performance.

DESCRIPTION OF EMBODIMENTS

An embodiment of the present invention is now described referring to the accompanying drawings.

Figure 1:
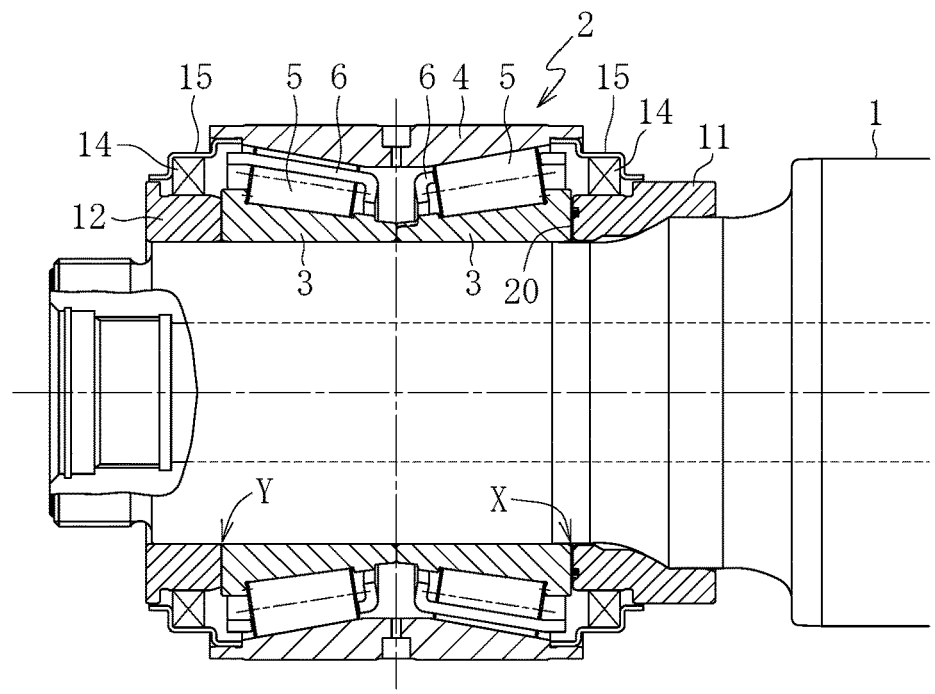
FIG. 1 is a sectional view of a bearing device for an axle according to one embodiment of the present invention.

A bearing device for an axle according to one embodiment of the present invention is configured to support an axle 1 of a railway vehicle, and, as illustrated in FIG. 1, mainly comprises a rolling bearing 2, a back cover 11, and an oil thrower 12. The back cover 11 and the oil thrower 12 are a pair of ring members arranged on both sides of the rolling bearing 2 in an axial direction. In the following description, an axial end side of the axle 1 (left side in FIG. 1) is referred to as an "axial end side", and a side opposite to the axial end side (right side in FIG. 1) is referred to as a "proximal end side".

The rolling bearing 2 is a double-row tapered roller bearing, and comprises inner rings 3, an outer ring 4, double-row tapered rollers 5, and a cage 6. The inner rings 3 have double-row raceways on outer peripheral surfaces thereof. The outer ring 4 has double-row raceways on an inner peripheral surface thereof. The double-row tapered rollers 5 are rolling elements arranged between the raceways of the inner rings 3 and the raceways of the outer ring 4. The cage 6 is configured to retain the tapered rollers 5 in each row at equal intervals in a circumferential direction. In the illustrated example, the inner rings 3 are formed so as to be divided for each raceway, whereas the outer ring 4 is integrally formed. The pair of inner rings 3 is press-fitted onto an outer periphery of the axle 1 of a railway vehicle under a state of being held in abutment against each other in the axial direction. An outer peripheral surface of the outer ring 4 is fixed to an axle box (not shown) of a railway vehicle. Oil seals 14 are mounted to both ends of the outer ring 4 in the axial direction through intermediation of sealing covers 15, respectively. The oil seals 14 are held in slide-contact with the back cover 11 and the oil thrower 12 or members mounted to the back cover 11 and the oil thrower 12 (sealing sleeves or the like), respectively, to thereby seal an internal space of the rolling bearing 2. A spacer may be arranged between the pair of inner rings 3 in the axial direction. Further, the outer ring 4 may be divided for each raceway. Moreover, the rolling bearing 2 is not limited to the tapered roller bearing, and may be, for example, a cylindrical roller bearing or a ball bearing.

Both of the back cover 11 and the oil thrower 12 are made of carbon steel, and are mounted to the axle 1 by press fitting or shrink fitting. The back cover 11, the rolling bearing 2, and the oil thrower 12 are fitted onto the outer periphery of the axle 1. After that, an axial-end nut (not shown) is screwed into an axial end of the axle 1 or a front cover is fixed to the axial end of the axle 1 with a bolt or the like, and the oil thrower 12 and the inner rings 3 of the rolling bearing 2 are sandwiched by the axial-end nut or the front cover and the back cover 11 from both sides in the axial direction. In this manner, the rolling bearing 2 is positioned with respect to the axle 1 in the axial direction.

Figure 2:
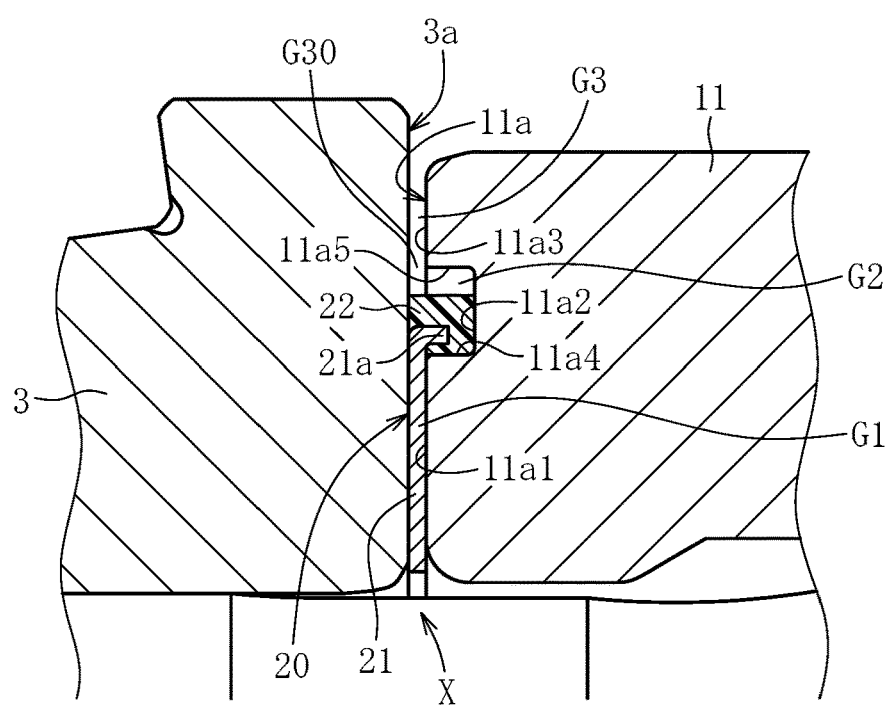
FIG. 2 is an enlarged view of the bearing device in FIG. 1.

As illustrated in FIG. 2, an end surface 11a of the back cover 11 on the axial end side and an end surface 3a of the inner ring 3 on the proximal end side are opposed to each other in the axial direction. In the illustrated example, on the end surface 11a of the back cover 11, there are formed a first region 11a1, a second region 11a2, and a third region 11a3. The first region 11a1 is formed at a radially inner end of the end surface 11a of the back cover 11. The second region 11a2 is formed on a radially outer side of the first region 11a1, and retreats to a side away from the inner ring 3 with respect to the first region 11a1. The third region 11a3 is formed on a radially outer side of the second region 11a2, and protrudes to a side closer to the inner ring 3 with respect to the second region 11a2. Each of the regions 11a1, 11a2, and 11a3 is formed of an annular flat surface orthogonal to the axial direction. A radially outer end of the first region 11a1 and a radially inner end of the second region 11a2 are connected to each other through a cylindrical surface 11a4. A radially outer end of the second region 11a2 and a radially inner end of the third region 11a3 are connected to each other through a cylindrical surface 11a5.

In the end surface 3a of the inner ring 3 on the proximal end side, at least a region opposed to the end surface 11a of the back cover 11 is formed of a single flat surface orthogonal to the axial direction. In the illustrated example, the entire region of the end surface 3a of the inner ring 3 is formed of a flat surface. A first axial gap G1, a second axial gap G2, and a third axial gap G3 are formed in spaces between the end surface 3a of the inner ring 3 and the first region 11a1, the second region 11a2, and the third region 11a3 of the end surface 11a of the back cover 11, respectively. The second axial gap G2 is formed on a radially outer side of the first axial gap G1, and is larger than the first axial gap G1. The third axial gap G3 is formed on a radially outer side of the second axial gap G2, has an inner diameter end G30 that opens to the second axial gap G2, and is smaller than the second axial gap G2.

A spacer member 20 is interposed between the end surface 11a of the back cover 11 on the axial end side and the end surface 3a on the proximal end side of the inner ring 3 on the proximal end side. The spacer member 20 comprises a spacer 21 and a sealing member 22.

The spacer 21 is formed of an annular flat plate, and is formed of, for example, a metal plate, in particular, a soft metal plate such as copper alloy. A rib 21a, which is bent to the proximal end side at a substantially right angle, is integrally formed on a radially outer end of the spacer 21.

Figure 3:
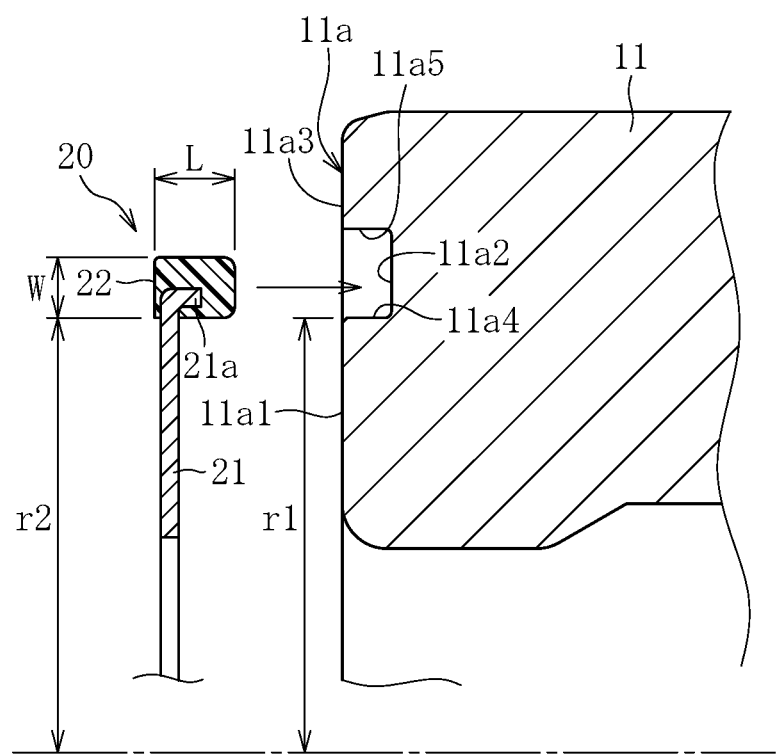
FIG. 3 is a sectional view for illustrating a state in which a spacer member is being assembled to an end surface of a back cover.
Figure 4:
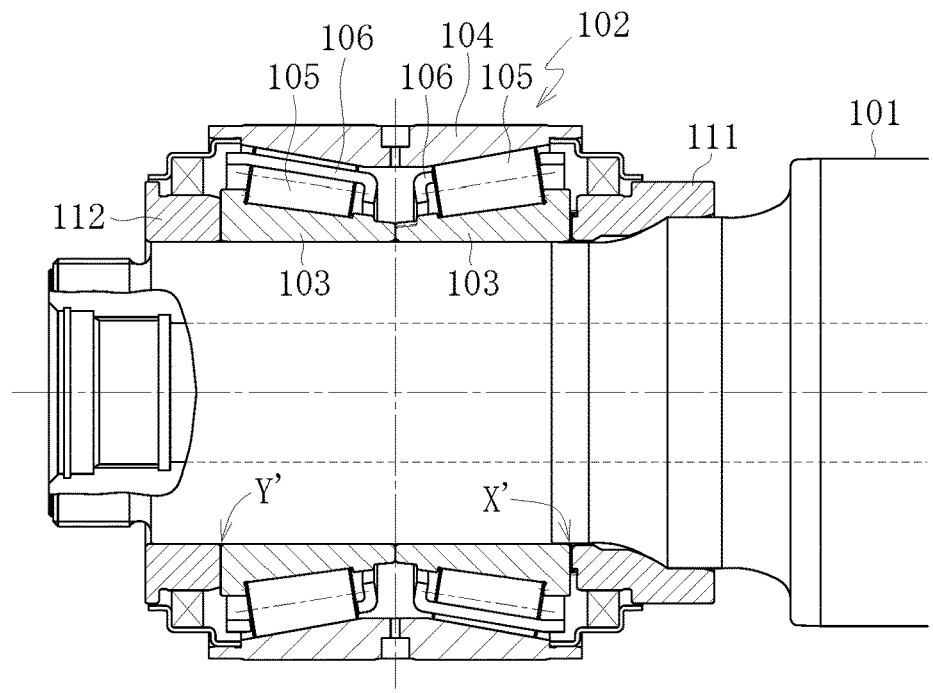
FIG. 4 is a sectional view of a related-art bearing device for an axle.
Figure 5:
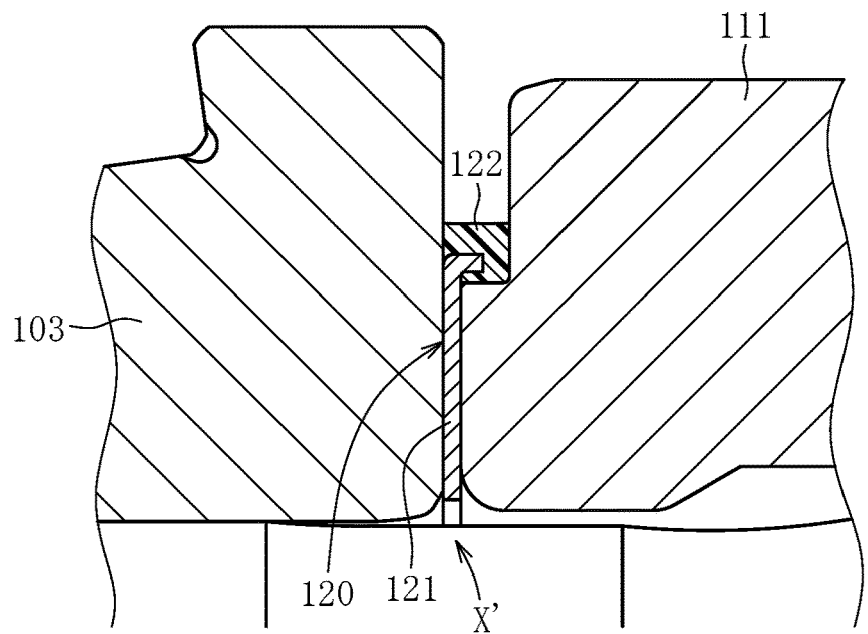
FIG. 5 is an enlarged view of the bearing device in FIG. 4.

The sealing member 22 is formed of an elastic material such as rubber, and is firmly fixed to the radially outer end of the spacer 21. The sealing member 22 has an annular shape, and is provided over the entire periphery of the radially outer end of the spacer 21. In the illustrated example, the sealing member 22 has a substantially rectangular sectional shape, and is provided so as to cover the entirety of the rib 21a of the spacer 21. As illustrated in FIG. 3, under a state before the spacer member 20 is assembled to the bearing device, an inner diameter r2 of the sealing member 22 is slightly smaller than a diameter r1 of the cylindrical surface 11a4 of the back cover 11. With this, at the time of the assembly, as indicated by the arrow in FIG. 3, the spacer member 20 is brought closer to the back cover 11 from the axial end side, and an inner peripheral surface of the sealing member 22 and the cylindrical surface 11a4 of the back cover 11 are fitted to each other with an interference so that the spacer member 20 and the back cover 11 can be integrated with each other. Thus, assembly work is facilitated.

The spacer 21 is arranged in the first axial gap G1, and is pressed from both the sides in the axial direction into contact with the end surface 3a of the inner ring 3 and the first region 11a1 of the end surface 11a of the back cover 11. With this, direct contact between the inner ring 3 and the back cover 11 is avoided, thereby being capable of suppressing fretting wear therebetween.

The sealing member 22 is arranged in the second axial gap G2, and is held in close-contact with both of the inner ring 3 and the back cover 11 over the entire periphery while being elastically deformed. In the illustrated example, the sealing member 22 is held in close-contact with the end surface 3a of the inner ring 3 and the second region 11a2 and the cylindrical surface 11a4 of the end surface 11a of the back cover 11 over the entire periphery. With this, the second axial gap G2 defined on the radially outer side of the spacer 21 is entirely sealed by the sealing member 22. Thus, wear powder generated due to fretting between the inner ring 3 and the back cover 11 through intermediation of the spacer 21 can be confined on the radially inner side with respect to the sealing member 22.

The third axial gap G3 that is smaller than the second axial gap G2 is formed on the radially outer side of the second axial gap G2 in which the sealing member 22 is arranged. With this, even when the sealing member 22 is damaged to be separated away from the spacer 21, movement of the sealing member 22 to the radially outer side is restricted with the third axial gap G3 having a smaller width. Thus, it is possible to avoid such a situation that the sealing member 22 projects to the radially outer side from the gap between the back cover 11 and the inner ring 3 to enter the inside of the rolling bearing 2.

In this case, it is preferred that the third axial gap G3 be set smaller than both of an axial dimension L and a radial thickness W (see FIG. 3) of the sealing member 22 in the state before the sealing member 22 is incorporated into the bearing device. With this, irrespective of the posture of the sealing member 22, the width of the sealing member 22 is larger than the third axial gap G3. Thus, passage of the sealing member 22 through the third axial gap G3 can be reliably avoided.

It is preferred that the third axial gap G3 be as small as possible so as to restrict passage of the sealing member 22. Therefore, for example, the third region 11a3 of the end surface 11a of the back cover 11 may be arranged on the axial end side with respect to the first region 11a1 so that the third axial gap G3 is smaller than the first axial gap G1. When the third axial gap G3 is excessively small, there is the following fear. Specifically, at the time of assembly, when the inner ring 3 and the back cover 11 in the state in which the spacer 21 is interposed therebetween are pressurized from both the sides in the axial direction, the surfaces opposed to each other through the third axial gap G3 (the end surface 3a of the inner ring 3 and the third region 11a3 of the end surface 11a of the back cover 11) are brought into abutment against each other, with the result that the spacer 21 and each of the inner ring 3 and the back cover 11 cannot be brought into complete close-contact with each other. Further, when the third axial gap G3 is excessively small, there is the following fear. Specifically, when the axle 1 warps during use of the bearing device, the surfaces opposed to each other through the third axial gap G3 slide against each other, with the result that wear powder or the like is generated. Therefore, it is preferred that the third axial gap G3 be secured to have a certain size (for example, 0.1 mm or more), and, for example, it is preferred that the third axial gap G3 be equal to or larger than the first axial gap G1. That is, it is preferred that the third region 11a3 of the end surface 11a of the back cover 11 be arranged at the same axial position as the first region 11a1 or be arranged on the proximal end side with respect to the first region 11a1. In particular, when the third region 11a3 and the first region 11a1 of the end surface 11a of the back cover 11 are arranged at the same axial position, processing for the end surface 11a of the back cover 11 is facilitated.

The present invention is not limited to the above-mentioned embodiment. For example, in the above-mentioned embodiment, the regions 11a1 to 11a3 located at the different axial positions are formed on the end surface 11a of the back cover 11 to form the axial gaps G1 to G3. However, the present invention is not limited thereto, and a plurality of regions located at different axial positions may be formed on the end surface 3a of the inner ring 3 to form the axial gaps G1 to G3. Alternatively, a plurality of regions located at different axial positions may be formed on each of the end surface 11a of the back cover 11 and the end surface 3a of the inner ring 3 to form the axial gaps G1 to G3.

Further, in the above-mentioned embodiment, there is exemplified the case in which the spacer member 20 (the spacer 21 and the sealing member 22) is interposed in a contact portion X between the back cover 11 and the inner ring 3. However, the present invention is not limited thereto. A spacer member similar to that described above may be interposed in a contact portion Y between the oil thrower 12 and the inner ring 3. Fretting wear is more liable to occur in the contact portion X on the proximal end side than in the contact portion Y on the axial end side. Thus, it is preferred that the spacer member be interposed in at least the contact portion X on the proximal end side.

The invention claimed is:

1. A bearing device for an axle, comprising:
    a rolling bearing comprising an inner ring, an outer ring, and a plurality of rolling elements interposed between the inner ring and the outer ring;
    a ring member provided on one side of the inner ring in an axial direction;
    a spacer sandwiched by the inner ring and the ring member; and
    a sealing member, which is fixed to a radially outer end of the spacer, and is held in contact with both of the inner ring and the ring member along a periphery of the sealing member while being elastically deformed,
    wherein the bearing device for an axle has:
        a first axial gap, which is defined between the inner ring and the ring member in the axial direction, and has the spacer interposed therein;
        a second axial gap, which is larger than the first axial gap, and has the sealing member interposed therein; and
        a third axial gap, which is defined on a radially outer side of the second axial gap, and is smaller than the second axial gap, and wherein an inner diameter end of the third axial gap opens to the second axial gap.

2. The bearing device for an axle according to claim 1, wherein an end surface of the ring member comprises:
    a first region formed on a radially inner end of the end surface of the ring member;
    a second region, which is formed on a radially outer side of the first region, and retreats to a side away from the inner ring with respect to the first region; and
    a third region, which is formed on a radially outer side of the second region, and protrudes to a side closer to the inner ring with respect to the second region,
    wherein the first axial gap is formed in axial spaces between an end surface of the inner ring on the one side in the axial direction and the first region of the end surface of the ring member,
    wherein the second axial gap is formed in axial spaces between the end surface of the inner ring on the one side in the axial direction and the second region of the end surface of the ring member, and
    wherein the third axial gap is formed in axial spaces between the end surface of the inner ring on the one side in the axial direction and the third region of the end surface of the ring member.

3. The bearing device for an axle according to claim 2, wherein the third axial gap is smaller than an axial dimension of the sealing member, and is smaller than a radial thickness of the sealing member.

4. The bearing device for an axle according to claim 2, wherein the rolling elements comprise double-row tapered rollers, and the double-row tapered rollers are interposed between the outer ring and the inner ring of the rolling bearing.

5. The bearing device for an axle according to claim 2, wherein the bearing device is configured to support an axle of a railway vehicle.

6. The bearing device for an axle according to claim 1, wherein the third axial gap is smaller than an axial dimension of the sealing member, and is smaller than a radial thickness of the sealing member.

7. The bearing device for an axle according to claim 1, wherein the rolling elements comprise double-row tapered rollers, and the double-row tapered rollers are interposed between the outer ring and the inner ring of the rolling bearing.

8. The bearing device for an axle according to claim 1, wherein the bearing device is configured to support an axle of a railway vehicle.

* * * * *